(12) United States Patent
Zou et al.

(10) Patent No.: US 10,990,406 B2
(45) Date of Patent: Apr. 27, 2021

(54) INSTRUCTION EXECUTION METHOD AND INSTRUCTION EXECUTION DEVICE

(71) Applicant: Shanghai Zhaoxin Semiconductor Co., Ltd., Shanghai (CN)

(72) Inventors: Penghao Zou, Beijing (CN); Zhi Zhang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 62 days.

(21) Appl. No.: 16/583,514

(22) Filed: Sep. 26, 2019

(65) Prior Publication Data
US 2020/0394043 A1 Dec. 17, 2020

(30) Foreign Application Priority Data
Jun. 12, 2019 (CN) .......................... 201910504891.7

(51) Int. Cl.
*G06F 9/38* (2018.01)
*G06F 9/30* (2018.01)
*G06F 9/22* (2006.01)
*G06F 11/10* (2006.01)

(52) U.S. Cl.
CPC ............ *G06F 9/3855* (2013.01); *G06F 9/226* (2013.01); *G06F 9/30105* (2013.01); *G06F 9/3861* (2013.01); *G06F 11/1012* (2013.01)

(58) Field of Classification Search
None
See application file for complete search history.

(56) References Cited

U.S. PATENT DOCUMENTS

| | | | |
|---|---|---|---|
| 9,501,286 B2 * | 11/2016 | Col ........................ | G06F 9/3017 |
| 2010/0299504 A1 * | 11/2010 | Henry ................. | G06F 9/30094 712/214 |
| 2013/0339668 A1 * | 12/2013 | Ould-Ahmed-Vall ...................... | G06F 9/30145 712/208 |

* cited by examiner

*Primary Examiner* — Michael Sun
(74) *Attorney, Agent, or Firm* — McClure, Qualey & Rodack, LLP

(57) ABSTRACT

An instruction execution device includes a processor. The processor includes an instruction translator, a reorder buffer, an architecture register, and an execution unit. The instruction translator receives a macro-instruction and translates the macro-instruction into a first micro-instruction, a second micro-instruction and a third micro-instruction. The instruction translator marks the first micro-instruction and the second micro-instruction with the same atomic operation flag. The execution unit executes the first micro-instruction to generate a first execution result and to store the first execution result in a temporary register. The execution unit executes the second micro-instruction to generate a second execution result and to store the second execution result in the architecture register. The execution unit executes the third micro-instruction to read the first execution result from the temporary register and to store the first execution result in the architecture register.

20 Claims, 5 Drawing Sheets

Mop ⟨ VMULPD ymm1 {k1}{z},ymm2, ymm3/m256/m64bcst{er}

FIG. 2A

μop1 ⟨ Mulpd ymm1, ymm2, ymm3; // u-op1

μop2 ⟨ Mulpd xmm1, xmm2, xmm3; // u-op2

FIG. 2B

INSTRUCTION EXECUTION METHOD AND INSTRUCTION EXECUTION DEVICE

CROSS REFERENCE TO RELATED APPLICATIONS

This application claims priority of China Patent Application No. 201910504891.7, filed on Jun. 12, 2019, the entirety of which is incorporated by reference herein.

BACKGROUND OF THE INVENTION

Field of the Invention

The present disclosure relates to a mechanism for executing instructions and, in particular, to an instruction execution method for micro-instructions with atomicity and an instruction execution device.

Description of the Related Art

In general, the data bus of the execution unit of the processor has a bit width of a fixed number of bits, for example, 128 bits. That is, the widest data width of data which can be calculated is limited to 128 bits. However, with the development of technology, especially in the field of large-scale processing of floating point instructions or vector instructions, the bit width of the data that the processor needs to process is getting wider and wider, and the instructions are getting more and more complex. It may be necessary to be able to support processing data of more bits, such as processing data with a bit width of 256 bits or even 512 bits.

Therefore, how to effectively expand the command types that can be processed based on the current processor architecture and support the output results that need to be presented in more bits has become one of the problems to be solved in the field.

BRIEF SUMMARY OF THE INVENTION

In accordance with one feature of the present invention, the present disclosure provides an instruction execution method applied to a processor. The processor comprises an instruction translator, an execution unit, an architecture register, and a reorder buffer. The instruction execution method comprises: using the instruction translator to receive a macro-instruction, and to translate the macro-instruction into a first micro-instruction, a second micro-instruction and a third micro-instruction, wherein the instruction translator marks the first micro-instruction and the second micro-instruction with the same atomic operation flag; using the execution unit to execute the first micro-instruction to generate a first execution result, and storing the first execution result in a temporary register; using the execution unit to execute the second micro-instruction to generate a second execution result, and storing the second execution result in the architecture register; and using the execution unit to execute the third micro-instruction to read the first execution result from the temporary register, and storing the first execution result in the architecture register.

In accordance with one feature of the present invention, the present disclosure provides an instruction execution device. The instruction execution device comprises a processor. The processor comprises an instruction translator, a reorder buffer, an architecture register, and an execution unit. The instruction translator receives a macro-instruction and translates the macro-instruction into a first micro-instruction, a second micro-instruction and a third micro-instruction. The instruction translator marks the first micro-instruction and the second micro-instruction with the same atomic operation flag. The execution unit executes the first micro-instruction to generate a first execution result, and store the first execution result in a temporary register, executes the second micro-instruction by the execution unit to generate a second execution result, and stores the second execution result in the architecture register, and executes the third micro-instruction to read the first execution result from the temporary register and stores the first execution result in the architecture register.

The instruction execution method and the instruction execution device of the present invention can apply the instruction translator to translate the macro-instruction into multiple micro-instructions. In addition to this, the micro-instructions for implementing the macro-instruction (such as the first and second micro-instructions described above, hereinafter referred to as "operation micro-instructions") are marked with the same atomic operation flag. Therefore, the macro-instruction can be divided into multiple micro-instructions with atomicity for processing. In addition to this, the operation results of the first and second micro-instruction are integrated by the third micro-instruction. According to the embodiments of the present invention, while extending the number of output bits that can be processed by the instruction execution device, the atomic operation flag can be used to mark certain types of exceptions occurred during the processing of the first micro-instruction onto the second micro-instruction with atomicity. Since the architecture register corresponding to the execution result of the first micro-instruction is not updated, the first micro-instruction can flexibly and firstly retire, without causing an error state of the architecture register. This increases the flexibility and the correctness of dividing a macro-instruction into multiple microinstructions for operation.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIGS. 2A-2B are schematic diagrams of an instruction execution method in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
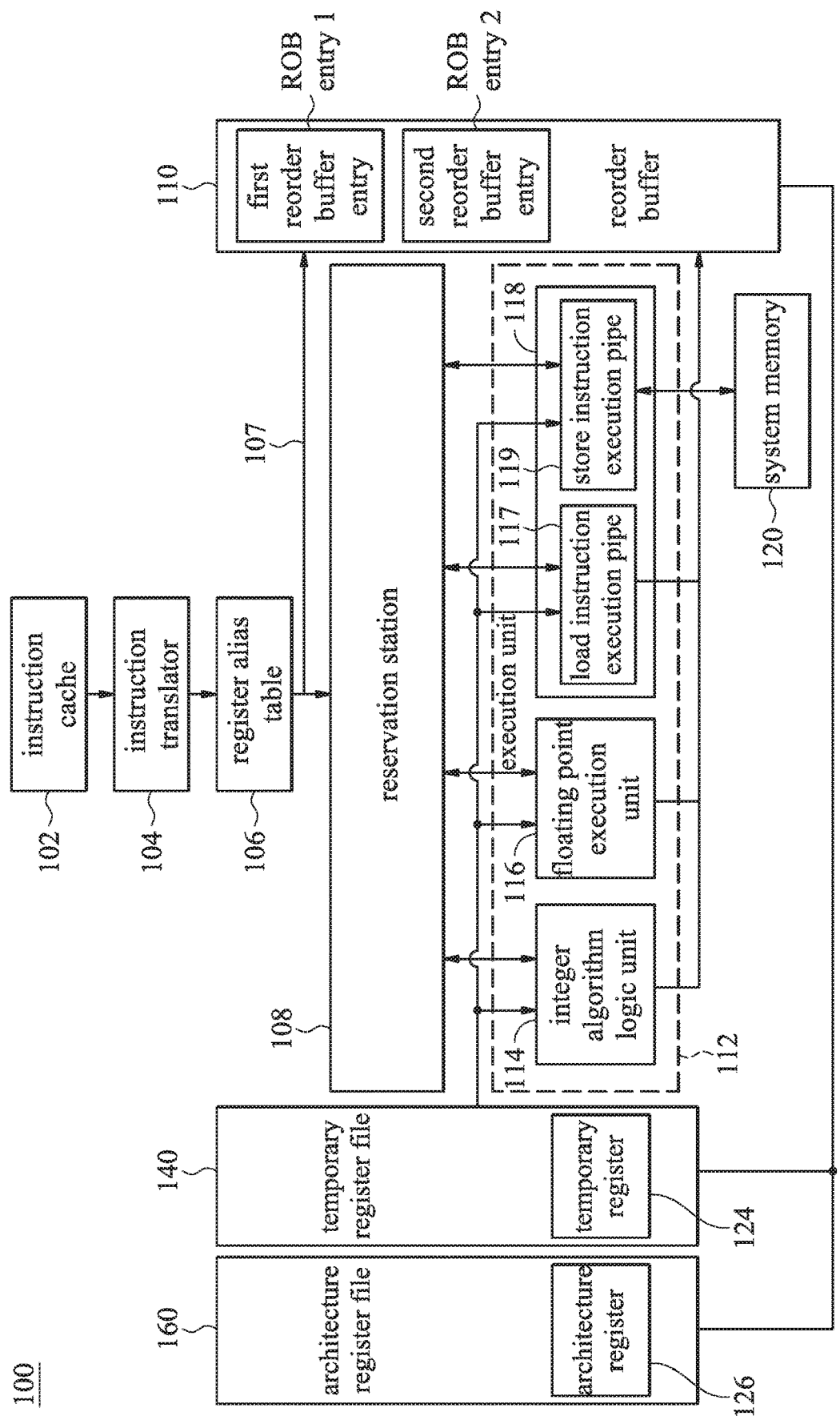
FIG. 1 is a block diagram of an instruction execution device in accordance with one embodiment of the present disclosure.

In one embodiment, please refer to FIG. 1. FIG. 1 is a block diagram of an instruction execution device 100 in accordance with one embodiment of the present disclosure. In one embodiment, the instruction execution device 100 includes an instruction translator 104 and an execution unit 112. The instruction translator 104 receives a macro-instruction and translates the macro-instruction into a first micro-instruction, a second micro-instruction and a third micro-instruction. The instruction translator 104 marks the first micro-instruction and the second micro-instruction with the same atomic operation flag. The execution unit 112 executes the first micro-instruction to generate a first execution result, and stores the first execution result in a temporary register 124 (for example, the temporary register 124 of one of multiple temporary registers in temporary register file 140). The execution unit 112 executes the second micro-instruction to generate a second execution result, and stores the second execution result in the architecture register 126 (for example, the architecture register 126 of one of multiple architecture registers in architecture register file 160). In addition to this, the execution unit 112 executes the third micro-instruction to read the first execution result from the temporary register 124 and store the first execution result in the architecture register 126.

In one embodiment, the instruction execution device 100 can be a processor. In addition, the processor can be implemented by using an integrated circuit, such as a microcontroller, a microprocessor, a digital signal processor, an application specific integrated circuit (ASIC), or a logic circuit.

In one embodiment, as shown in FIG. 1, the instruction execution device 100 (for example, implemented by a microprocessor) includes an instruction cache 102. The instruction cache 102 stores macro-instruction of instruction set architecture, such as an x86 instruction set architecture. In addition, the instruction translator 104 receives macro-instruction and translates it into micro-instructions (or µop). Then, micro-instructions are provided to a register alias table (RAT) 106. The register alias table 106 marks the dependency of the micro-instruction in the form of a reordering buffer index (ROB index) or a physical register file index (PRF index). The dependency refers to which instruction the destination operand of an instruction whose source operand depends on. For example, the source operand of the subsequent arithmetic logic unit (ALU) instruction can depend on the target operand of the previous loaded instruction. The dependencies are determined by the program (or the instruction sequence itself). The register alias table 106 then issues micro-instructions to the reservation station (RS) 108 in program order and issues micro-instructions to the reorder buffer (ROB) 110 via the instruction path 107. The micro-instruction (ISSUE INST) issued from the register alias table 106 can generally be referred to as a micro-instruction. The reorder buffer 110 stores entries for each instruction issued from the register alias table 106. The reservation station 108 dispatches the instructions whose operands are all ready to the appropriate one of the multiple execution units 112. Whether an operand is ready can be judged by whether or not the aforementioned dependency flag is released.

The execution units 112 can include one or more integer execution units, such as integer algorithm logic unit 114, one or more floating point execution units 116, a memory order buffer (MOB) 118, and the like. The memory order buffer 118 typically processes memory type instructions that access the system memory 120. The memory order buffer 118 includes a load instruction execution pipe 117 and a store instruction execution pipe 119. The system memory 120 can connect with the memory order buffer 118 via a data cache (e.g., L2 data cache, not shown) and a bus interface unit (BIU, not shown). The execution unit 112 provides their results to the reorder buffer 110, which ensures that the instructions are retired in order.

The reservation station 108 includes at least one register queue (RS queue or RS matrix). When the instruction is ready to be executed (all operands of the instruction are ready and all dependencies are removed), the corresponding instruction is dispatched by the register queue to the corresponding execution unit 112.

It should be noted that the register alias table 106 and its previous micro-instructions are executed sequentially (the instructions are executed in the order of the program), and the subsequent reserved stations 108 and execution units 112 are executed out of order: the micro-instruction in the reserved station 108 whose operands are all ready is firstly dispatched to the execution unit 112 for execution (while there are a plurality of prepared micro-instructions, then the longest time existing in the reservation station 108 one is selected: That is, "the oldest" micro-instruction is selected). Therefore, the program sequence is out of order at these stages, and the reorder buffer 110 ensures that the micro-instructions after execution are sequentially retired in the program order. Please refer to FIGS. 2A-2B, FIGS. 2A-2B are schematic diagrams of an instruction execution method in accordance with one embodiment of the present disclosure. In one embodiment, the execution unit 112 can obtain a 128-bit execution result output by performing the operation once. When the execution unit 112 wants to support the 256-bit macro-instruction Mop, it needs to operate twice to obtain the 256-bit execution result output. For example, when the instruction translator 104 receives the macro-instruction Mop, the instruction translator 104 translates the macro-instruction Mop into a first micro-instruction µop1 and a second micro-instruction µop2 (as shown in FIG. 2B). The first micro-instruction µop and the second micro-instruction µop2 are 128-bit micro-instructions. Therefore, after translating the 256-bit macro-instruction Mop into two 128-bit microinstructions (the first microinstruction µop1 and the second microinstruction µop2), the execution unit 112 executes two 128-bit micro-instructions (the first micro-instruction µop1 and the second micro-instruction µop2) can obtain a 256-bit output. Thereby, the number of bits of the instruction that the execution unit 112 can process is expanded.

In one embodiment, after the instruction translator 104 receives the macro-instruction Mop, the macro-instruction Mop can be translated into more micro-instructions (for example, five micro-instructions).

The instruction execution device 100 needs to be able to support data processing of more bits in more and more cases. Taking the AVX256 instruction set as an example, the bit width supported by the single instruction multiple data (SIMD) register file of the instruction execution device 100 is increased to 256 bits. However, if the data bus width of the execution unit 112 is still 128 bits, in this case, it is necessary to implement the operation of one single AVX256 macro-instruction by multiple micro-instructions (for example, two µops). However, the two micro-instructions that implement the AVX256 operation (hereinafter referred to as "operation micro-instructions") need to update the same 256-bit architecture register 126 in the SIMD register file, if one of the two operation micro-instructions occurs a replay or exception during the execution, and the other one correctly executed may be retired and submitted the result to update the corresponding portion of the 256-bit architecture register 126. In this case, the 256-bit architecture register 126 will have half of the correct and half of the error state. This is not allowed by the processor specification/manual, which allows all bits of the architecture register 126 to be all correct or all incorrect, but does not allow for such an unsure indeterminate state. Therefore, the present invention proposes to mark the same atomic operation flag as "operation micro-instructions" (for example, the aforementioned first and second micro-instructions) corresponding to the same macro-instruction to represent that the first destination operand of the first micro-instruction and the second destination operand of the second micro-instruction are directed to the same architecture register 126 for subsequent processing when one of the operation micro-instruction causes an execution exception condition to occur (described in more detail later).

Figure 3:
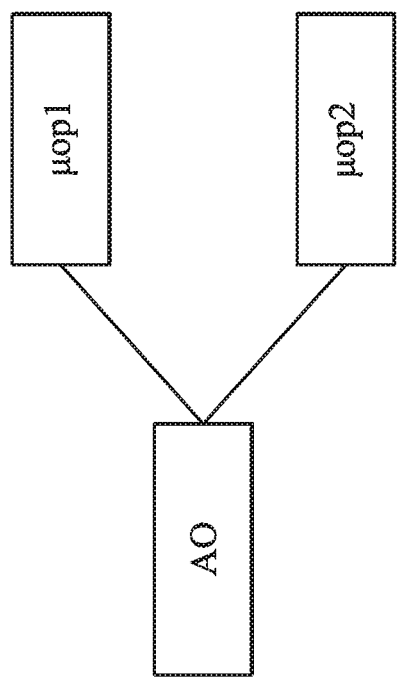
FIG. 3 is a schematic diagram of an instruction execution method in accordance with one embodiment of the present disclosure.

Please refer to FIG. 2A to FIG. 2B and FIG. 3 together. FIG. 3 is a schematic diagram of an instruction execution method in accordance with one embodiment of the present disclosure. The instruction translator 104 marks the first micro-instruction µop1 and the second micro-instruction µop2 as the same atomic operation flag. FIG. 3 is used to represent an atomic operation AO, and the atomic operation AO can be understood as a macro-instruction. For example, the macro-instruction Mop can be disassembled into the first micro-instruction µop1 and the second micro-instruction µop2. In other words, the same atomic operation flag represents the first destination operand of the first micro-instruction and the second destination operand of the second micro-instruction all point to the same architecture register 126. In one embodiment, the atomic operation flag is marked on the first reorder buffer entry (ROB entry) 1 and the second reorder buffer entry (ROB entry) 2 in the reorder buffer 110 respectively corresponding to the first micro-instruction µop1 and the second micro-instruction µop2. In one embodiment, it is defined that more than two micro-instructions (e.g., the first micro-instruction µop1 and the second micro-instruction µop2) are regarded as a set of atomic operation AO. Since the execution unit 112 needs to execute two 128-bit micro-instructions (the first micro-instruction µop1 and the second micro-instruction µop2) to obtain a 256-bit output, the correlation between the first micro-instruction µop1 and the second micro-instruction µop2 is very strong. Sometimes the execution unit 112 will execute instructions out of order. For example, after the execution unit 112 executes the first micro-instruction µop1, a plurality of other micro-instructions are executed. And then, the second microinstruction µop2 is executed. In this case, it is easy to cause the parameter of the second micro-instruction µop2 to be incorrect, and the execution result is also wrong. Therefore, the micro-instructions belonging to the same atomic operation AO (for example, the first micro-instruction µop1 and the second micro-instruction µop2) need to be processed specially according to the atomic operation flag when these micro-instructions occur the event of replay, retire, and exception during execution. The following taking FIG. 3 as an example to describe the detailed description of the instruction execution method of an embodiment with respect to the replay, retire, and exception processing according to the aforementioned atomic operation flag. It should be noted that, in this embodiment, the execution results of the first micro-instruction µop1 and the second micro-instruction µop2 are directly used to update the architecture register 126 after the first micro-instruction µop1 and the second micro-instruction µop2 are retired, respectively.

In one embodiment, when an exception occurs in the execution of the first micro-instruction µop1 (including de-normal exception, an invalid exception, a zero divide exception, a precision exception, an underflow exception, or an overflow exception, etc.), the exception condition is marked to the first reorder buffer entry (ROB entry) 1 of the micro-instruction µop1, and the first micro-instruction µop1 is not retired, until the second micro-instruction µop2 having the same atomic operation flag as the first micro-instruction µop1 is executed and when the first micro-instruction µop1 is the oldest in the reorder buffer 110 (i.e., at that time, the reorder buffer 110 should execute the retire procedure of the first micro-instruction µop1 in order), an exception handler corresponding to the exception of the first micro-instruction µop1 is performed. It is worth noting that the reason for waiting for the end of the execution of the second micro-instruction µop2 is: an execution status word will be updated when the execution of the second micro-instruction µop2 ends. The instruction translator 104 needs to decide which exception handler to execute based on the value of the execution status word. When the exception handler corresponding to the exception of the first micro-instruction µop1 is completed, the first micro-instruction µop1 and the second micro-instruction µop2 are re-decoded via the instruction translator 104. After the first micro-instruction µop1 and the second micro-instruction µop2 are executed without any error, the first micro-instruction µop1 and the second micro-instruction µop2 can be retired when they are the oldest respectively. In this embodiment, the reorder buffer 110 determines that the second micro-instruction µop2 needs to be bound to the first micro-instruction µop1 according to the same atomic operation flag to perform the foregoing exception handler.

In one embodiment, when the execution of the first micro-instruction µop1 is normal, the first micro-instruction µop1 cannot be retired temporarily, and the second micro-instruction µop2 causes an exception, since the first micro-instruction µop1 has the same atomic operation flag as the second micro-instruction µop2, the exception condition is marked to the first reorder buffer entry (ROB entry) 1 of the first micro-instruction µop1. When the first micro-instruction µop1 is the oldest in the reorder buffer 110, an exception handler corresponding to the exception of the second micro-instruction μop2 is performed. When the exception handler corresponding to the exception of the second micro-instruction μop2 is completed, the first micro-instruction μop1 and the second micro-instruction μop2 are re-decoded via the instruction translator 104, and the execution of the first micro-instruction μop1 and the second micro-instruction μop2 is completed without any error, the first micro-instruction μop1 and the second micro-instruction μop2 can be retired when they are the oldest respectively.

In one embodiment, some execution errors don't require the micro-instructions to be re-decoded by the instruction translator 104, and the micro-instructions can be re-executed by the execution unit 112 to obtain the correct execution result. This kind of operation is called "replay". In one embodiment, when the execution result of the first micro-instruction μop1 is wrong, the execution unit 112 starts to perform a replay from the first micro-instruction μop1: That is, the execution unit re-executes the first micro-instruction μop1 and its subsequent micro-instructions (including re-executing the second micro-instruction μop2). In one embodiment, when the execution result of the first micro-instruction μop1 is correct and the execution result of the second micro-instruction μop2 is wrong, since the second micro-instruction μop2 has the same atomic operation flag as the first micro-instruction μop1, the order buffer 110 does not perform the retire of the first micro-instruction μop1 but perform the replay of the second micro-instruction μop2 when the first micro-instruction μop1 is oldest. After the execution unit 112 re-executes the second micro-instruction μop2 and its subsequent micro-instructions, the order buffer 110 can retire the first micro-instruction μop1.

It should be noted that, in the embodiment described in FIG. 3, the first micro-instruction μop1 cannot retire when the execution result of the first micro-instruction μop1 is correct because an error occurs in the second micro-instruction μop2 having its atomicity. Therefore, the present invention further proposes the embodiments of FIG. 4 and FIG. 5. A macro-instruction is translated into at least three micro-instructions. The at least three micro-instructions includes at least two operation micro-instructions (such as a first micro-instruction and a second micro-instruction). When the first micro-instruction is executed correctly, the first micro-instruction can be retired but the architecture register 126 cannot be updated, and the result is stored in the temporary register 124. After the first micro-instruction and second micro-instruction are executed correctly, the first execution result is integrated into the architecture register 126 by the third micro-instruction from the temporary register 124. Thus, when the first micro-instruction is executed correctly, the first micro-instruction can be retired and will not cause the error state of the architecture register 126, and will not waste hardware resources.

Figure 4:
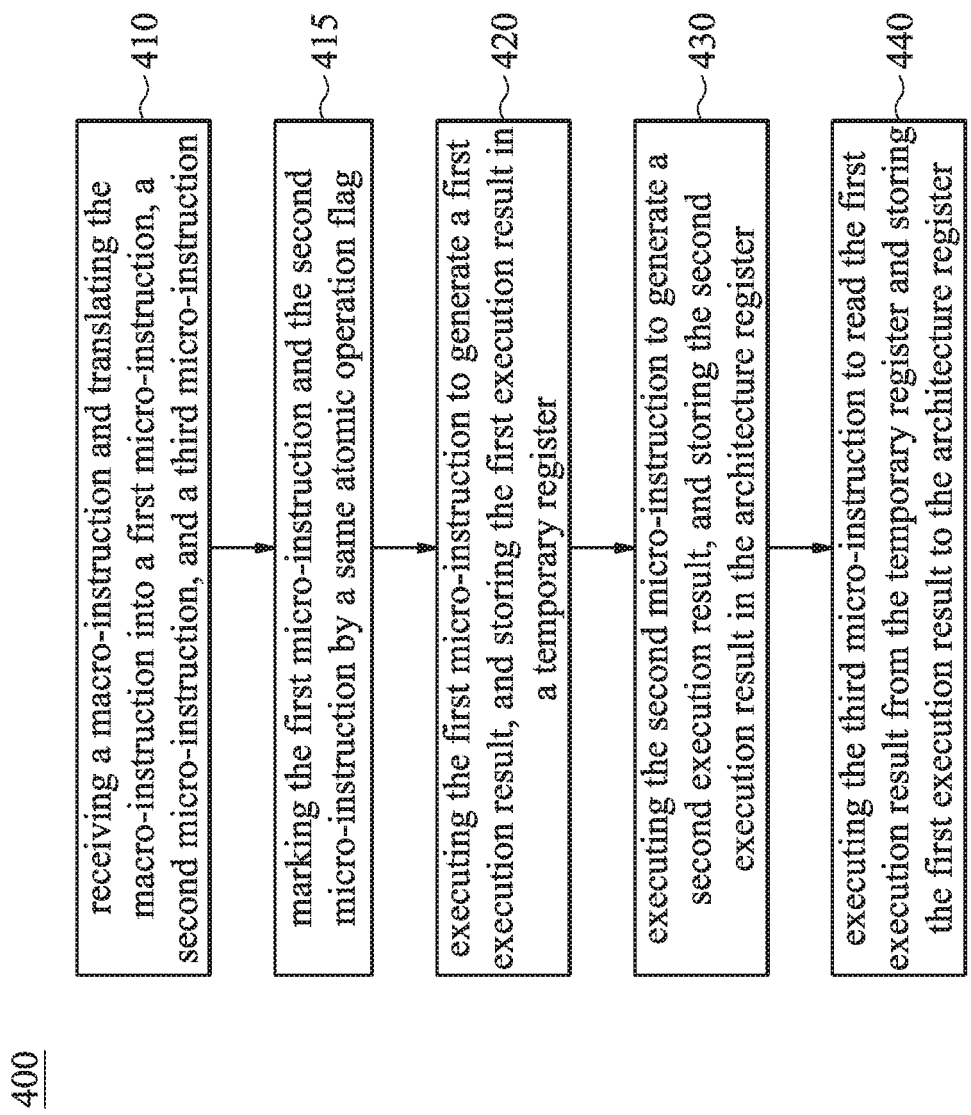
FIG. 4 is a flowchart of an instruction execution method 400 in accordance with one embodiment of the present disclosure.
Figure 5:
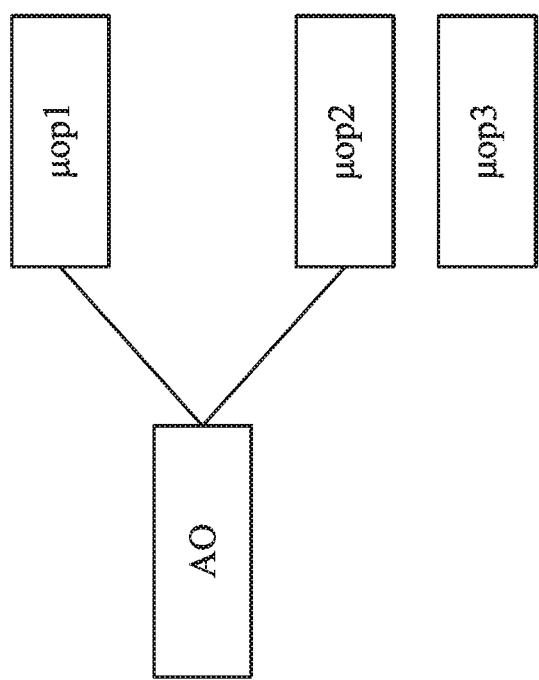
FIG. 5 is a schematic diagram of an instruction execution method in accordance with one embodiment of the present disclosure.

Please refer to FIG. 4 to FIG. 5. FIG. 4 is a flowchart of an instruction execution method 400 in accordance with one embodiment of the present disclosure. FIG. 5 is a schematic diagram of an instruction execution method in accordance with one embodiment of the present disclosure. The instruction execution method 400 is applicable to a processor including an instruction translator 104, an execution unit 112, an architecture register 126, and a reorder buffer 110. In one embodiment, the instruction execution apparatus 100 of FIG. 1 can be applied to execute the instruction execution method 400 of FIG. 4.

In step 410, the instruction translator 104 receives a macro-instruction and translates the macro-instruction into a first micro-instruction μop1, a second micro-instruction μop2, and a third micro-instruction μop3 (as shown in FIG. 3).

In step 415, the instruction translator 104 marks the first micro-instruction and the second micro-instruction by the same atomic operation flag. The same atomic operation flag represents that the first micro-instruction μop1 and the second micro-instruction μop2 are operation micro-instructions of the same macro-instruction and have atomicity there between. In one embodiment, the atomically is represented by the first destination operand of the first micro-instruction μop1 and the second destination operand of the second micro-instruction μop2 both pointing to the same architecture register (e.g., architecture register 126 in FIG. 1).

In one embodiment, when the instruction translator 104 decodes, the instruction translator 104 marks the same atomic operation flag in a first reorder buffer entry (ROB entry) 1 and a second reorder buffer entry (ROB entry) 2 in the reorder buffer 110 corresponding to the first micro-instruction μop1 and the second micro-instruction μop2 respectively. The micro-instructions (the first micro-instruction μop1 and the second micro-instruction μop2) are represented as part of the atomic operation OA. In one embodiment, the instruction translator 104 marks the first micro-instruction μop1 with the start identifier of the atomic operation OA, and the second micro-instruction μop2 with the end identifier of the atomic operation OA. Other components of the instruction execution device 100 can know that the micro-instructions (when the macro-instruction requires three or more operation micro-instructions, for example, the decoded program sequence is sequentially performed by the first micro-instruction μop1, the fourth micro-instruction μop4, and the second micro-instruction μop2, etc., the fourth micro-instruction μop4 between the first micro-instruction μop1 and the second micro-instruction μop2 does not require to be marked) between the start identifier and the end identifier are part of the atomic operation OA.

In one embodiment, when the execution unit 112 executes a floating point instruction, if the required bandwidth of the floating point instruction is 128 bits, after the execution is completed, the execution unit 112 outputs an execution result of 128 bits and some of the identification fields into the reorder buffer entry corresponding to the floating point instruction in the reorder buffer 110. The identification field includes, for example, the aforementioned atomic operation flag, replay flag, exception flag, and related information (e.g., including a mark location, an error code, etc., which are required by the instruction translator 104 to execute the exception handler,).

In one embodiment, when the instruction translator 104 decodes, the atomic operation flag is marked in each of the reorder buffer entries of the first micro-instruction μop1 and the second micro-instruction μop2. And the subsequent components (e.g., The reorder buffer 110, the execution unit 112) can also mark various error conditions in the respective reorder buffer entries of the first micro-instruction μop1 and/or the second micro-instruction μop2. In one embodiment, if the instruction cache 102, the reservation station 108, and/or the floating point execution unit 116 detect(s) the first micro-instruction μop1 and/or the second micro-instruction μop2 in their corresponding processing stages (decoding stage, launch stage and execution stage, respectively) occur(s) exception(s), the exception flag and its associated information are then marked to the entry of the corresponding micro-instruction stored in the reorder buffer 110.

In one embodiment, if the first micro-instruction μop1 and/or the second micro-instruction μop2 are detected to have a replay condition, an exception condition (with an exception condition code), or another error condition before being executed or during execution by the execution unit 112, the reorder buffer 110 can process (e.g., deal with exception conditions) micro-instructions having the same atomic operation flag in accordance with the aforementioned marking. For example, after the floating instruction execution unit 116 executes the first micro-instruction μop1, if the first micro-instruction μop1 is detected to have a first exception with its first execution result, the first exception is marked according to its atomic operation flag at a second micro-instruction μop2 with its atomicity. For example, the first exception may be marked in a reorder buffer entry of the second micro-instruction μop2. It should be noted that the first exception in the foregoing embodiment can occur after the first micro-instruction μop1 is executed by the execution unit 112, and this kind of exception can be called a post exception. The post exception is, for example, a precision exception, an underflow exception, or an overflow exception. Common exceptions further include the exceptions associated with source operands that occur before being executed by the execution unit 112, and this kind of exception can be called a pre-exception. Examples of pre-exceptions include a de-normal exception, an invalid exception, and a zero divide exception. The mark of different exceptions for different micro-instructions, as well as the mark of the replay condition of different micro-instructions, will be explained in subsequent paragraphs.

In the embodiment corresponding to FIG. 4, the reorder buffer 110 determines that whether a micro-instruction in which an exception condition occurs has an atomic instruction according to the atomic operation flag, and if so, the exception condition of an older micro-instruction (e.g., the aforementioned first micro-instruction μop1) is marked at a younger atomic instruction (e.g., the aforementioned second micro-instruction μop2). Since the error result of the first micro-instruction μop1 is only updated into the temporary register 124 after the first micro-instruction μop1 is retired, it does not cause the state of the architecture register 126 to be indeterminate, so the older micro-instruction (for example, the first microinstruction μop1 described above)) can be retired firstly. When the younger atomic instruction becomes the oldest (i.e., when executing the retire procedure of the younger atomic instruction), the exception conditions of the two micro-instructions are processed together. The manner in which the exception condition is processed is, for example, but not limited to, the reorder buffer 110 transmitting a mark location and an error code of the at least one exception result to an ucode (not shown) in the instruction translator 104. The ucode selects one of multiple exception handlers stored therein based on the mark location and the error code.

In step 420, the execution unit 112 executes the first micro-instruction μop1 to generate a first execution result, and stores the first execution result in a temporary register 124. Thereby, even if the first execution result is wrong, the architecture register 126 is not affected.

In step 430, the execution unit 112 executes the second micro-instruction μop2 to generate a second execution result, and store the second execution result in the architecture register 126.

In step 440, the execution unit 112 executes the third micro-instruction μop3 to read the first execution result from the temporary register 124 and stores the first execution result to the corresponding location in the architecture register 126.

Referring to FIG. 1 and FIG. 5 together, the first micro-instruction μop1/second micro-instruction μop2 can only update the temporary register 124/architecture register 126 only if it is successfully retired. Therefore, when an exception occurs in the first microinstruction μop1, the first microinstruction μop1 can retire and mark the exception on the second microinstruction μop2. Therefore, when an exception occurs in the first micro-instruction μop1, the first micro-instruction μop1 can be retired and the exception can be marked on the second micro-instruction μop2. Since the retire of the first micro-instruction μop1 does not update the architecture register 126, and the second micro-instruction μop2 will execute the exception handler before retired, the error result will not be updated in the architecture register 126, thereby avoiding the problem of the architectural register 126 having an uncertain state.

In order to further demonstrate that no matter what kind of abnormal situation occurs, the instruction execution method described in this embodiment can solve the abnormal situation. The following specifically describes (1) when the first micro-instruction μop1 occurs in a pre-exception condition; (2) when the first micro-instruction μop1 occurs in the post exception condition; (3) when the first micro-instruction μop1 is correctly executed and retired successfully, the second micro-instruction μop2 causes an exception (either the pre-exception or the post exception) (4) when the first micro-instruction μop1 or the second microinstruction μop2 needs to be replayed.

(1) When the first micro-instruction μop1 occurs in a pre-exception condition: in one embodiment, before the first micro-instruction μop1 is executed by the execution unit 112, if it is detected that at least one source operand corresponding to the first micro-instruction μop1 has a de-normal exception, an invalid exception, or a zero divide exception, then the execution unit 112 does not retire the first micro-instruction μop1 (or even does not execute the first micro-instruction μop1 at all), thereby avoiding the problem of the architectural register 126 having an uncertain state. The de-normal exception is, for example, that the format of the source operand is incorrect. The invalid exception is, for example, that the operand of the source operand is invalid or there is an un-executable error. The exception of the zero divide exception is the previous exception. These pre-exceptions can be detected before execution.

(2) When the first micro-instruction μop1 occurs in the post exception condition: as described above, there are some exceptions which are known from the execution result after the execution unit 112 executes the micro-instruction. For example, when the first execution result includes at least one exception result of a precision exception, an underflow exception, or an overflow exception, the exception is called the post exception. The execution unit 112 marks at least one post exception (hereinafter referred to as the first exception) of the first micro-instruction μop1 to the second micro-instruction μop2 according to the atomic operation flag. In one embodiment, the execution unit 112 marks the first exception to the second reorder buffer entry (ROB entry) 2 corresponding to the second micro-instruction μop2 in the reorder buffer 110. The reorder buffer 110 can retire the first micro-instruction μop1 when entry index of the first micro-instruction μop1 in the reorder buffer 110 becomes the oldest. When entry index of the second micro-instruction μop2 in the reorder buffer 110 becomes the oldest (i.e., when the retire procedure of the second micro-instruction μop2 is to be executed in sequence), the reorder buffer 110 temporarily does not retire the second micro-instruction µop2. Instead, a mark location and an error code corresponding to the first exception described above are sent to the instruction translator 104. In addition to this, the instruction translator 104 executes an exception handler corresponding to the mark location and the error code. It is worth noting that when the first micro-instruction µop1 has the first exception and the second micro-instruction also has an exception (either the pre-exception or the post exception, which is referred to as the second exception), the execution unit 112 can still mark the first exception on the second micro-instruction µop2 when the first exception is detected. When the second exception is detected, it is also marked in the second microinstruction µop2. The reorder buffer 110 can firstly retire the first micro-instruction µop1. When the reorder buffer 110 executes the retire procedure of the second micro-instruction µop2 in order, the first and second exceptions can be synthesized to compare whose corresponding micro-instruction is older, and the mark location and error code of the order one are passed to the instruction translator 104 to execute the corresponding exception handler. In this case, the first micro-instruction µop1 is older than the second micro-instruction µop2, so the mark position and the error code of the aforementioned first exception are still passed to the instruction translator 104.

(3) When the first micro-instruction µop1 is correctly executed and retired successfully, the second micro-instruction µop2 causes an exception (either the pre-exception or the post exception): when the first micro-instruction µop1 is detected as a normal result after being executed by the execution unit 112, and the second micro-instruction µop2 is detected causing a second exception, the reorder buffer 110 retires the first micro-instruction µop1 (when the entry index of the first micro-instruction µop1 is the oldest in the reorder buffer 110). The reorder buffer 110 does not update the architecture register 126. In this case, the second exception can be the pre-exception, such as including a de-normal exception, an invalid exception, or a zero divide exception. The second exception also can be the post exception, such as including a precision exception, an underflow exception, or an overflow exception. In one embodiment, the reorder buffer 110 temporarily does not retire the second microinstruction µop2 (when the entry index of the second micro-instruction µop2 is the oldest in the reorder buffer 110). The reorder buffer 110 transmits a mark location and an error code corresponding to the second exception to the instruction translator 104. The instruction translator 104 executes one of the exception handlers corresponding to the mark location and the error code.

Based on the description above, in the embodiment corresponding to FIG. 4 and FIG. 5, the reorder buffer 110 cannot retire the first micro-instruction µop1 only when the first micro-instruction µop1 occurs the pre-exception (as in the previous condition (1)). In other cases, the reorder buffer 110 can firstly retire the first micro-instruction µop1. More specifically, when the first execution result occurs a post exception (such as a precision exception, an underflow exception, or an overflow exception) or the second execution result occurs any type of exceptions (such as a de-normal exception, an invalid exception, a zero divide exception, a precision exception, an underflow exception, or an overflow exception), the reorder buffer 110 can retire the first micro-instruction µop1 and not update architecture register 126, and mark these exception conditions in second micro-instruction µop2. When the reorder buffer 110 is ready to perform retiring of the second micro-instruction µop2 (when the second micro-instruction µop2 is the oldest in the reorder buffer 110), the second micro-instruction µop2 is temporarily not retired. The reorder buffer 110 performs the exception handler according to the marks carried by the second micro-instruction µop2. For example, the reorder buffer 110 transmits the mark location and the error code to the instruction translator 104 according to the marks carried by the second microinstruction µop2. The instruction translator 104 executes one of the exception handlers corresponding to the mark location and the error code.

(4) When the first micro-instruction µop1 or the second microinstruction µop2 needs to be replayed: the following discusses the execution error for situations that replay are required. When the first execution result causes error and requires to be replayed, the execution unit 112 re-executes the first micro-instruction µop1 and all subsequent micro-instructions. When the first execution result is correct, but the second execution result causes error and requires replay, the execution unit 112 re-executes the second micro-instruction µop2 and all subsequent micro-instructions. This embodiment different from the embodiment of FIG. 3 is that the first micro-instruction µop1 in this example can be retired firstly without waiting for the replay execution of the second microinstruction µop2 having its atomicity. In the embodiment of FIG. 3, the reorder buffer 110 cannot perform the retire operation of the first micro-instruction µop1 when the first microinstruction µop1 is the oldest, but instead the reorder buffer 110 performs the replay of the second micro-instruction µop2 when the first microinstruction µop1 is the oldest.

It should be noted that when decoding the macro instruction, the instruction translator 104 of the present invention does not limit that the number of "operation micro-instructions" for implementing the macro instruction is two. In other embodiments, the macro instruction can be translated into N (N≥2) operation micro-instructions as needed. The execution results of the front (N−1) operation micro-instructions are respectively stored in (N−1) corresponding temporary registers 124. After the N operation micro-instructions are correctly executed and retired, the execution results of the (N−1) temporary registers 124 is stored in the architecture register 126 by the N+1th micro-instruction.

Based on the description above, the instruction execution method and the instruction execution device shown in FIGS. 4 and 5 of the present invention can apply the instruction translator to translate the macro-instruction into multiple micro-instructions. In addition to this, the micro-instructions for implementing the macro-instruction (such as the first and second micro-instructions described above) are marked with the same atomic operation flag. Therefore, the macro-instruction can be divided into multiple atomic micro-instructions with atomicity for processing. In addition to this, the operation results of the first and second micro-instruction are integrated by the third micro-instruction. According to the embodiments of the present invention, while extending the number of output bits that can be processed by the instruction execution device, the atomic operation flag can be used to mark certain types of exceptions occurred during the processing of the first micro-instruction onto the second micro-instruction with atomicity. Since the architecture register corresponding to the execution result of the first micro-instruction is not updated, the first micro-instruction can flexibly and firstly retire, without causing an error state of the architecture register. This increases the flexibility and the correctness of dividing a macro-instruction into multiple microinstructions for operation.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An instruction execution method, applied to a processor, wherein the processor comprises an instruction translator, an execution unit, an architecture register, and a reorder buffer, the instruction execution method comprising:
   using the instruction translator to receive a macro-instruction, and to translate the macro-instruction into a first micro-instruction, a second micro-instruction and a third micro-instruction, wherein the instruction translator marks the first micro-instruction and the second micro-instruction with the same atomic operation flag;
   using the execution unit to execute the first micro-instruction to generate a first execution result, and storing the first execution result in a temporary register;
   using the execution unit to execute the second micro-instruction to generate a second execution result, and storing the second execution result in the architecture register; and
   using the execution unit to execute the third micro-instruction to read the first execution result from the temporary register and store the first execution result in the architecture register.

2. The instruction execution method of claim 1, wherein the atomic operation flag indicates that both of a first destination operand of the first micro-instruction and a second destination operand of the second micro-instruction point to the architecture register.

3. The instruction execution method of claim 1, wherein the atomic operation flag is marked in a first reorder buffer entry (ROB entry) and a second reorder buffer entry in the reorder buffer respectively corresponding to the first micro-instruction and the second micro-instruction.

4. The instruction execution method of claim 1, wherein before the first micro-instruction is executed by the execution unit, if the first micro-instruction is detected that a source operand corresponding to the first micro-instruction causes a previous exception, the first micro-instruction is not retired.

5. The instruction execution method of claim 1, wherein after the first micro-instruction is executed by the execution unit, if the first micro-instruction is detected that the first execution result causes a first exception, the first exception is marked to the second micro-instruction according to the atomic operation flag.

6. The instruction execution method of claim 5, wherein the first exception is marked to a second reorder buffer entry corresponding to the second micro-instruction in the reorder buffer, and the first micro-instruction is retired.

7. The instruction execution method of claim 5, wherein the second micro-instruction is not retired, and the reorder buffer transmits a mark location and a first error code corresponding to the first exception to the instruction translator, so that the instruction translator executes an exception handler corresponding to the mark location and the first error code.

8. The instruction execution method of claim 5, wherein when the second micro-instruction is detected causing a second exception, the reorder buffer transmits a mark location and a first error code corresponding to the first exception to the instruction translator, so that the instruction translator executes an exception handler corresponding to the mark location and the first error code.

9. The instruction execution method of claim 1, wherein when the first micro-instruction is detected as a normal result after being executed by the execution unit, and the second micro-instruction is detected causing a second exception, the first micro-instruction is retired.

10. The instruction execution method of claim 9, wherein the second exception comprises a de-normal exception, an invalid exception, a zero divide exception, a precision exception, an underflow exception, or an overflow exception.

11. The instruction execution method of claim 9, wherein the second micro-instruction is not retired, the reorder buffer transmits a mark location and a second error code corresponding to the second exception to the instruction translator, so that the instruction translator performs pre-processing according to the mark position and the second error code.

12. The instruction execution method of claim 1, wherein when the first micro-instruction or the second micro-instruction is detected causing an exception, the execution unit re-executes the first micro-instruction and all micro-instructions subsequent to the first micro-instruction.

13. An instruction execution device, comprising:
   a processor, comprising:
      an instruction translator, configured to receive a macro-instruction and translate the macro-instruction into a first micro-instruction, a second micro-instruction and a third micro-instruction, wherein the instruction translator marks the first micro-instruction and the second micro-instruction with the same atomic operation flag;
      a reorder buffer;
      an architecture register; and
      an execution unit, configured to execute the first micro-instruction to generate a first execution result, store the first execution result in a temporary register, execute the second micro-instruction to generate a second execution result, store the second execution result to the architecture register, and execute the third micro-instruction to read the first execution result from the temporary register and store the first execution result in the architecture register.

14. The instruction execution device of claim 13, wherein the atomic operation flag indicates that both of a first destination operand of the first micro-instruction and a second destination operand of the second micro-instruction point to the architecture register.

15. The instruction execution device of claim 13, wherein the atomic operation flag is marked in a first reorder buffer entry (ROB entry) and a second reorder buffer entry in the reorder buffer respectively corresponding to the first micro-instruction and the second micro-instruction.

16. The instruction execution device of claim 13, wherein before the first micro-instruction is executed by the execution unit, if the first micro-instruction is detected that a corresponding one of at least one source operand causes a previous exception, the first micro-instruction is not retired.

17. The instruction execution device of claim 13, wherein after the first micro-instruction is executed by the execution unit, if the first micro-instruction is detected that the first execution result causes a first exception, the first exception is marked to the second micro-instruction according to the atomic operation flag.

18. The instruction execution device of claim 17, wherein the first exception is marked to a second reorder buffer entry corresponding to the second micro-instruction in the reorder buffer, and the first micro-instruction is retired.

19. The instruction execution device of claim 17, wherein the second micro-instruction is not retired, the reorder buffer transmits a mark location and a first error code corresponding to the first exception to the instruction translator, so that the instruction translator executes an exception handler corresponding to the mark location and the first error code.

20. The instruction execution device of claim 17, wherein when the second micro-instruction is detected that the second micro-instruction has caused a second exception, the reorder buffer transmits a mark location and a first error code corresponding to the first exception to the instruction translator, so that the instruction translator executes an exception handler corresponding to the mark location and the first error code.

\* \* \* \* \*